US008602892B1

(12) United States Patent
Reiss et al.

(10) Patent No.: US 8,602,892 B1
(45) Date of Patent: Dec. 10, 2013

(54) GAME SYSTEM MIXING PLAYER VOICE SIGNALS WITH GAME SOUND SIGNAL

(75) Inventors: Jordan Reiss, San Francisco, CA (US); Paul Donovan, Santa Clara, CA (US); David Northway, San Carlos, CA (US); Adam Barry, San Francisco, CA (US)

(73) Assignee: AG Acquisition Corporation, San Francisco, CA (US)

( * ) Notice: Subject to any disclaimer, the term of this patent is extended or adjusted under 35 U.S.C. 154(b) by 1368 days.

(21) Appl. No.: 11/844,230

(22) Filed: Aug. 23, 2007

Related U.S. Application Data

(60) Provisional application No. 60/823,365, filed on Aug. 23, 2006.

(51) Int. Cl.
*A63F 13/00* (2006.01)

(52) U.S. Cl.
USPC ............... 463/35; 463/40; 463/41; 463/42; 370/266; 370/270

(58) Field of Classification Search
USPC ................... 463/35, 40–42; 370/266, 270
See application file for complete search history.

(56) References Cited

U.S. PATENT DOCUMENTS

| | | | |
|---|---|---|---|
| 1,127,161 A | 2/1915 | Baldwin | 381/379 |
| 2,782,423 A | 2/1957 | Eli et al. | 2/209 |
| 4,270,025 A | 5/1981 | Alsup et al. | 179/15.55 R |
| 4,302,635 A | 11/1981 | Jacobsen et al. | 381/371 |
| 4,472,607 A | 9/1984 | Houng | 181/18 |
| 4,554,993 A | 11/1985 | Houng | 181/130 |
| 4,588,868 A | 5/1986 | Bertagna et al. | 381/382 |
| 4,829,571 A | 5/1989 | Kakiuchi et al. | 381/309 |
| 4,965,836 A | 10/1990 | Andre et al. | 381/370 |
| 5,018,599 A | 5/1991 | Dohi et al. | 181/129 |
| 5,035,005 A | 7/1991 | Hung | 2/209 |
| 5,579,430 A | 11/1996 | Grill et al. | 395/2.12 |
| 5,685,775 A | 11/1997 | Bakoglu et al. | 463/41 |
| 5,793,878 A | 8/1998 | Chang | 381/370 |
| 6,016,347 A | 1/2000 | Magnasco et al. | 379/430 |
| 6,069,964 A | 5/2000 | Yang | 381/374 |
| 6,097,809 A | 8/2000 | Lucey et al. | 379/430 |
| 6,183,367 B1 * | 2/2001 | Kaji et al. | 463/42 |
| 6,241,612 B1 * | 6/2001 | Heredia | 463/42 |
| 6,295,366 B1 | 9/2001 | Haller et al. | 381/374 |

(Continued)

FOREIGN PATENT DOCUMENTS

EP 1638364 3/2006
WO WO 03/103255 12/2003

OTHER PUBLICATIONS

"Zehn Kopfliorer-Mikrofon-Sets im Vergleich," Computer Bild, Oct. 17, 2007 [retrieved on Mar. 2, 2009], pp. 2-12, http://www.computerbild.de/artikel/cbs-Tests-Hardware-Zehn-Kopfhoerer-Mikrofon-Sets-im-Vergleich-1873070.html.

(Continued)

*Primary Examiner* — Lawrence Galka
(74) *Attorney, Agent, or Firm* — Bey & Cotropia PLLC

(57) ABSTRACT

Conventional game consoles have a preference to connect to the Internet, which facilitates audio communications by gamers. However, when conventional game consoles are connected over a local area network, they somehow inhibit audio communications. A game communications exchange is coupled to game consoles and audio gear sets of gamers to facilitate audio communications by creating a common channel and distribute audio information from the common channel.

9 Claims, 9 Drawing Sheets

(56) References Cited

U.S. PATENT DOCUMENTS

| | | | |
|---|---|---|---|
| 6,466,681 B1 | 10/2002 | Siska, Jr. et al. | 381/372 |
| 6,599,194 B1* | 7/2003 | Smith et al. | 463/30 |
| 6,618,714 B1 | 9/2003 | Abrahams | 706/45 |
| 6,658,130 B2 | 12/2003 | Huang | 381/384 |
| 6,731,771 B2 | 5/2004 | Cottrell | 381/371 |
| 6,775,390 B1 | 8/2004 | Schmidt et al. | 381/371 |
| 6,868,164 B2 | 3/2005 | Ito et al. | 381/370 |
| 7,082,393 B2 | 7/2006 | Lahr | 704/233 |
| 7,090,582 B2* | 8/2006 | Danieli et al. | 463/35 |
| 7,181,037 B2 | 2/2007 | Birch | 381/375 |
| 7,371,175 B2* | 5/2008 | Gilboy et al. | 463/35 |
| 7,458,894 B2* | 12/2008 | Danieli et al. | 463/42 |
| 2002/0110246 A1 | 8/2002 | Gosior et al. | 381/2 |
| 2002/0131616 A1 | 9/2002 | Bronnikov et al. | 381/370 |
| 2002/0196960 A1 | 12/2002 | Pham et al. | 381/375 |
| 2004/0132509 A1 | 7/2004 | Glezerman | 455/575.2 |
| 2004/0213427 A1 | 10/2004 | Yoon | 381/370 |
| 2005/0003892 A1* | 1/2005 | Cheng et al. | 463/35 |
| 2005/0007500 A1 | 1/2005 | Lin et al. | 348/790 |
| 2005/0181872 A1* | 8/2005 | Acharya et al. | 463/35 |
| 2006/0062417 A1 | 3/2006 | Tachikawa | 381/378 |
| 2006/0256992 A1 | 11/2006 | Liao | 381/371 |
| 2007/0064969 A1 | 3/2007 | Chou | 381/381 |
| 2007/0093279 A1 | 4/2007 | Janik | 455/569.1 |
| 2007/0183616 A1 | 8/2007 | Wahl et al. | 381/370 |
| 2007/0261153 A1 | 11/2007 | Wise et al. | 2/423 |
| 2008/0152160 A1 | 6/2008 | Chew et al. | 381/71.6 |
| 2008/0311986 A1 | 12/2008 | Reiss et al. | 463/35 |
| 2009/0252355 A1 | 10/2009 | Mao | 381/309 |

OTHER PUBLICATIONS

International Search Report for Application Serial No. PCT/US2008/087280, dated Jul. 15, 2009.

Fibush, David K., "Integrating Digital Audio Into the Serial Digital Video Signal," SMPTE Journal, pp. 574-579, Sep. 1994.

Press Release, "Xbox Turns Up the Volume on the Future of Video Games" [online], May 20, 2001 [retrieved on Apr. 8, 2010], 2 pp., Retrieved From the Internet: http://www.microsoft.com/presspass/press/2002/may02/05-20e3brie . . . .

Turtle Beach, "New Gaming Headphones Provide Amplification of Game Audio and Xbox Live Chart" [online], Oct. 8, 2006 [retrieved on Apr. 8, 2010], 1 p., Retrieved From the Internet: http://www.turtlebeach.com/releases/20061008/Ear-Force-X1-Xbo . . . .

Turtle Beach, "First Wireless Headphone for Xbox 360 with Independent Volume Control of Amplified Chat and Game Audio" [online], Aug. 22, 2007 [retrieved on Apr. 8, 2010], 2 pp., Retrieved From the Internet: http://www.turtlebeach.com/releases/20070822/Turtle-Beach-Annou . . . .

International Search Report and Written Opinion for Application Serial No. PCT/US2010/058629, dated Jan. 28, 2011, 8 pp.

* cited by examiner

GAME SYSTEM MIXING PLAYER VOICE SIGNALS WITH GAME SOUND SIGNAL

CROSS-REFERENCE TO RELATED APPLICATION

This application claims the benefit of U.S. Provisional Application No. 60/823,365, filed Aug. 23, 2006, which is incorporated herein by reference.

TECHNICAL FIELD

The technical field relates generally to communications and, more particularly, to an exchange for facilitating communications between gamers and technical staff.

BACKGROUND

Where multiple gaming consoles are connected together in a LAN environment (such as in a team-versus-team setup at a tournament), it is difficult for the individual gamers to communicate with their teammates and also hear the sounds of their individual games. As such, at a gaming tournament, with teammates sitting side-by-side in front of multiple game screens with their volumes turned up, the teammates communicate strategy to each other by shouting. The gamers would like to be able to isolate sounds so that they can hear their individual games' sounds (shooting, explosions, music, and so on), but they also would like to be able to communicate with their teammates.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In an aspect of the present invention, a system form of the invention comprises multiple game consoles coupled via a local area network and not the Internet; multiple television sets coupled to the multiple game consoles; multiple gamer audio gear sets including headphones and microphones; and a game communications exchange into which is coupled the multiple television sets and the multiple gamer audio gear sets. The game communications exchange includes a first set of circuitry for creating a common channel for audio information coming from the multiple television sets, which originates from the multiple game consoles, and audio information coming from the multiple gamer audio gear sets, which originates from the microphones.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Figure 1:
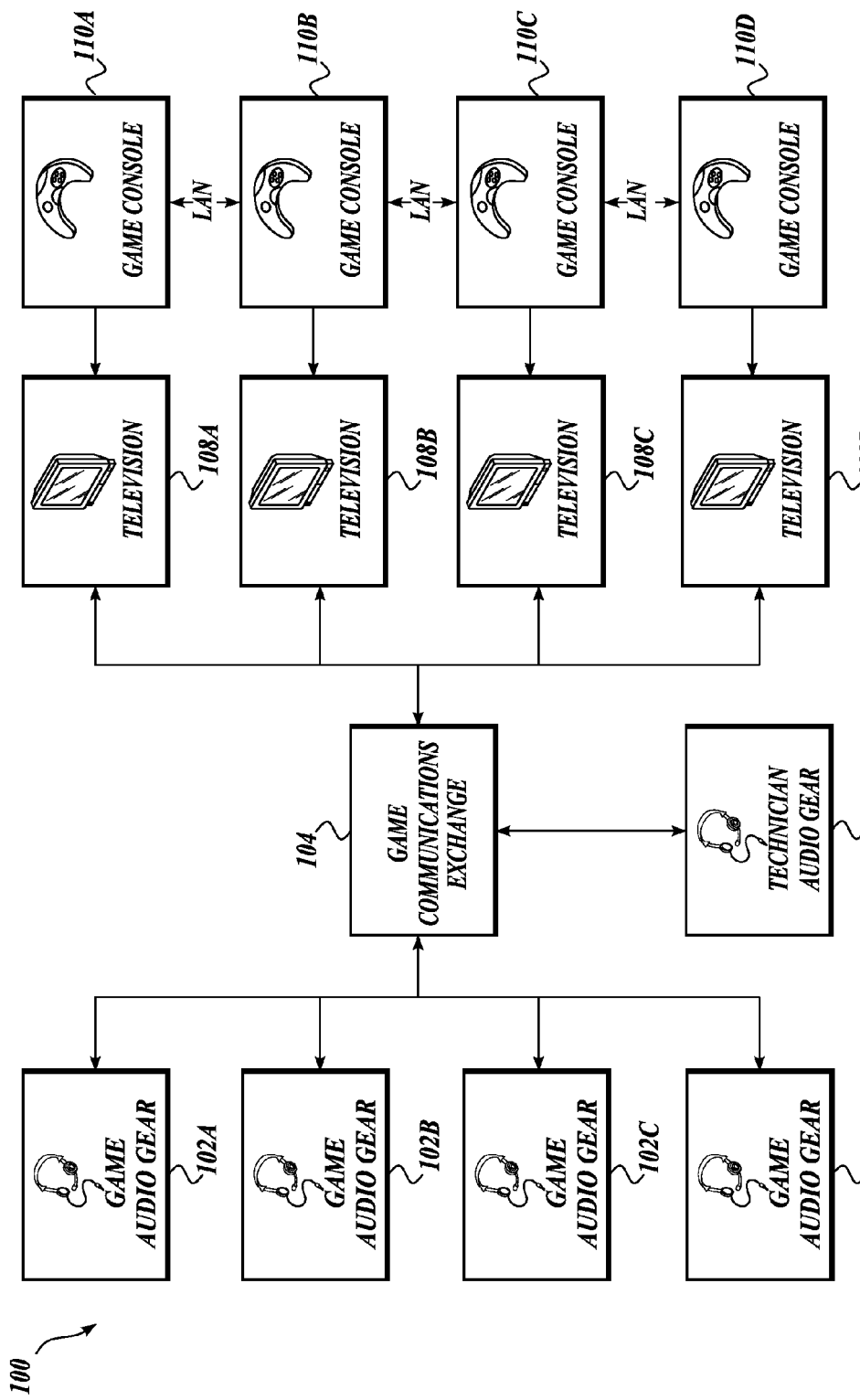
FIG. 1 is a block diagram illustrating exemplary pieces of hardware for facilitating communications among gamers.

FIG. 1 illustrates an exemplary system 100 where communications among gamers and technical staff are facilitated by a game communications exchange 104. A number of game consoles 110a-110d, which are special computers built for playing games, can be controlled by the usage of joy sticks, trackballs, buttons, steering wheels, light guns, or specially designed controllers that include a joy stick, direction pad, and several buttons or triggers. Games playable on these game consoles 110a-110d attempt to give players the experience of actually being in a jungle, a cockpit of an airplane, or another setting or situation.

In the embodiment illustrated by FIG. 1, game consoles 110a-110d are networked together via a local area network in which groups of game consoles 110a-110d and other devices are dispersed over a limited area, such as a room or a tournament hall, and connected by a communications link that enables any game consoles 110a-110d to interact with any other on the network. Various game consoles inhibit the transmission of gamers' audio information when the game consoles are not connected to the Internet. These game consoles 110a-110d can be coupled to television sets 108a-108d, which operate as audiovisual output devices of game consoles 110a-110d. Modern television sets 108a-108d include various jacks, which are female fittings coupled to electronic circuitry inside the television sets 108a-108d to process audio and video information.

One of the jacks available on each of the television sets 108a-108d is a headphone jack into which a plug of an audio cable can be inserted to electrically couple a television set 108a-108d to a jack selected from a set of jacks on the game communications exchange 104. The game communications exchange 104 also includes a number of jacks into which terminal ends of audio cables coupling the television sets 108a-108d can be inserted. The remaining jacks of the game communications exchange 104 are female fittings ready to receive plugs from gamer audio gear sets 102a-102d and a technician audio gear 106. These audio gear sets 102a-102d and 106 include headphones coupled with a microphone so that a gamer or a technician can listen to both audio information provided by the game consoles 110a-110d as well as utterances by the gamers and the technician transmitted via microphones to the game communications exchange 104 allowing gamers to play and formulate game strategies without noisy distractions in a room or tournament hall.

In other words, various embodiments of the present invention create one communal voice channel in which audio information from gamers, the technician, and game audio information is placed so that it can be redistributed to other gamers and the technician. A number of knobs (not shown) are provided on the game communications exchange 104 to allow gamers and the technician to adjust the balance and loudness level of various pieces of audio information. For example, a set of knobs allow gamers and the technician to specify how much of the audio information coming from the game consoles and how much of the audio information coming from various microphones is to be represented to headphones. As another example, a set of knobs allows gamers and the technician to adjust the volume of each headphone for each gamer and the technician.

Figures 2A, 2B:
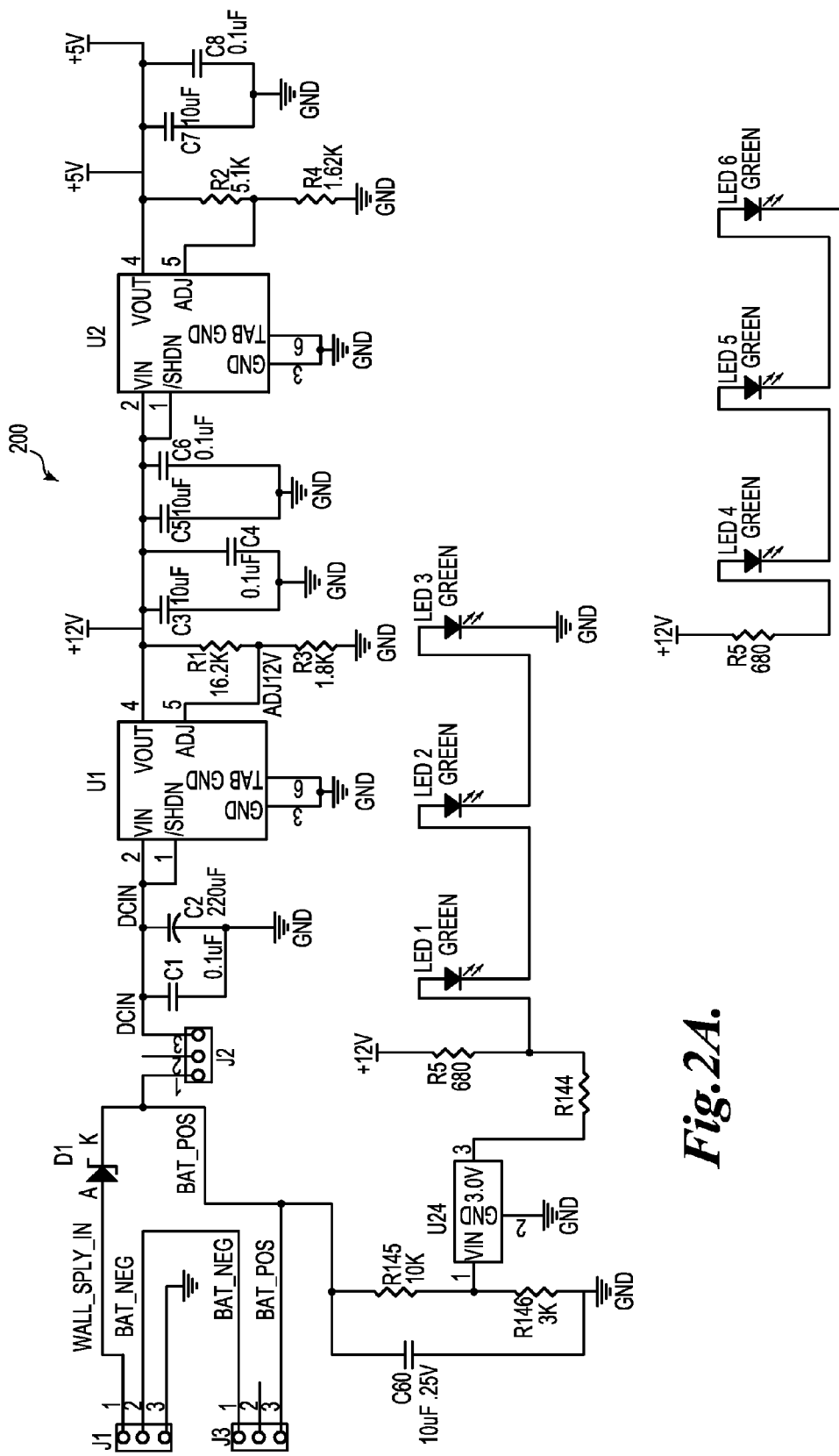
FIGS. 2A-2B are circuit diagram diagrams illustrating an exemplary power control circuitry.

FIGS. 2A-2B illustrate an exemplary power circuit 200 that provides power to the game communications exchange 104. The power circuit 200 includes three jacks J1-J3, each of which is a female fitting coupled to an electric circuit used with a plug to make a connection with another circuit. J1 is a three-pin jack that can be mated with plugs coupled to a wall-mounted power supply. Pin 1 of the jack J1 receives current and presents the current to a Zener diode D1 at its anode. Pin 2 of the jack J1 is coupled to pin 3 of the jack J3 and is open when the wall-mounted power supply is plugged in and is shorted to ground when the wall-mounted power supply is unmounted. Pin 3 of the jack J1 is coupled to ground.

The cathode of the Zener diode D1 is coupled to pin 1 of the jack J3, pin 1 of the jack J2, and to a node that is coupled to a first plate of a capacitor C60 and a second port of a resistor R145. The capacitor C60 preferably has a value of about 10 microfarads.

The resistor R145 preferably has a value of 10 kilo-ohms. The jack J3 has three pins, pins 1 and 3 being previously discussed. Pin 2 is left open. The jack J3 is preferably connected to batteries to power the game communications exchange 104. Thus, using jacks J1, J3, the game communications exchange 104 can be powered either by an AC source, such as the wall-mounted power supply, or a DC source, which is provided by batteries. The Zener diode D1 acts to isolate power coming from the batteries through the jack J3 when the game communications exchange 104 is powered by the AC source coming from the wall-mounted power supply. In other words, if the game communications exchange 104 is powered through a wall plug, the power of the batteries will be conserved.

Pin 3 of the jack J2 is coupled to a node that is further coupled to a second plate of a capacitor C1, which preferably has a value of 0.1 microfarad, a first plate of a capacitor C2, which preferably has a value of 220 microfarads, and is coupled to pin 1 and pin 2 of a voltage regulator U1. Pin 1 of the voltage regulator U1 is used to present a negative logic signal to put the voltage regulator into a low power shutdown state. In other words, the output, pin 4, of the voltage regulator U1 will be off when the voltage presented at pin 1 of the voltage regulator U1 is pulled low. If the pin 1 of the voltage regulator U1 is not connected at all, the voltage regulator U1 will also be in the low power shutdown state. Pin 2 of the voltage regulator U1 receives power from pin 3 of the jack J2. Capacitors C1, C2 are configured in parallel to act as bypass capacitors. Pin 3 and pin 6 of the voltage regulator are connected to ground.

Any suitable voltage regulator can be used, such as a voltage regulator with Part No. LT1764. Pin 2 of the voltage regulator U1 is the IN pin. Pin 1 of the voltage regulator U1 is the SHDN pin. Pin 3 is the GND pin, which is generally connected to ground. Pin 6 is the SENSE pin, which is typically pulled below ground in a dual supply system, such as in the embodiments of the present invention, which allows the voltage regulator load to be returned to a negative voltage supply, while still allowing the voltage regulator U1 to start and operate. Pin 4 of the voltage regulator U1 is the OUT pin, which supplies power to the load connected to the voltage regulator U1. Pin 4 of the voltage regulator U1 provides a constant voltage signal, such as a constant 12 volts, which is indicated by a 12-volt source connected to a node into which the pin 4 of the voltage regulator U1 is coupled.

Also coupled to this node is terminal 2 of a resistor R1, which has a suitable value of 16.2 kilo-ohms. Terminal 1 of the resistor R1 is coupled to pin 5 of the voltage regulator U1 as well as terminal 2 of a resistor R3, which has a suitable value of 1.8 kilo-ohms. Terminal 1 of the resistor R3 is coupled to ground. Pin 5 of the voltage regulator U1 is an ADJ pin and a reference voltage is provided into this pin to ensure that the output voltage at pin 4 of the voltage regulator U1 is at a desired output voltage range, such as 12 volts. The resistors R1, R3 act as a voltage divider to maintain a voltage provided to pin 5 of the voltage regulator U1.

The voltage regulator U1 and other voltage regulators are needed because the range of power supplies from either the wall-mounted power supply or batteries fluctuates. The 12-volt source, pin 4 of the voltage regulator U1, and the second terminal of the resistor R1 are all coupled to the first terminal of a capacitor C3, which has a suitable value of about 10 microfarads. The second terminal of the capacitor C3 is coupled to ground. Coupled to the first terminal of the capacitor C3 is a second terminal of a capacitor C4, which has a suitable value of about 0.1 microfarad. A first terminal of the capacitor C4 is coupled to ground. A first terminal of a capacitor C5, which has a suitable value of 10 microfarads, is coupled to the second terminal of the capacitor C4. A second terminal of the capacitor C5 is coupled to ground. Also coupled to ground is a first terminal of a capacitor C6, which has a suitable value of 0.1 microfarad. A second terminal of the capacitor C6 is coupled to the first terminal of the capacitor C5. These capacitors C3-C6 act as bypass capacitors in parallel configuration to smooth the voltage waveform coming from pin 4, which is the output pin of the voltage regulator U1. The 12 volts produced by the voltage regulator U1 are used for primarily audio circuitry, but are also used for some LED bar graph microchips.

A 12-volt voltage source is presented at pin 1, which is the SHDN of voltage regulator U2 and pin 2, which is the IN pin of the voltage regulator U2. Pin 4 of the voltage regulator U2 is coupled to a second terminal of a resistor R2, which has a suitable value of 5.1 kilo-ohms. A first terminal of the resistor R2 is coupled both to pin 5 of the voltage regulator U2 as well as to a second terminal of a resistor R4, which has a suitable value of 1.62 kilo-ohms. A first terminal of the resistor R4 is coupled to ground. A first terminal of a capacitor C7, which has a suitable value of 10 microfarads, is coupled to pin 4, which presents a constant 5-volt voltage source. A second terminal of the capacitor C7 is coupled to ground. Also coupled to ground is a first terminal of a capacitor C8, which has a suitable value of 0.1 microfarad. A second terminal of the capacitor C8 is coupled to the first terminal of the capacitor C7. These capacitors C7, C8 act as bypass capacitors in parallel configuration that further smooth the 5-volt waveform presented at pin 4 of the voltage regulator U2. The 5-volt voltage source that is provided by the voltage regulator U2 is primarily used for the bar graph LED microchips.

Pin 1, which is connected to the positive terminal of one or more batteries of the jack J3 is coupled to a first terminal of a capacitor C60, which has a suitable value of about 10 microfarads. A second terminal of the capacitor C60 is coupled to ground. Also coupled to ground is a first terminal of a resistor R146, which has a suitable value of about 3 kilo-ohms. A second terminal of the resistor R146 is coupled to pin 1, which is the IN pin of a voltage detector U24, and a first terminal of a resistor R145, which has a value of about 10 kilo-ohms. A second terminal of the resistor R145 is coupled to the first terminal of the capacitor C60.

Suitable voltage detectors include the TC54 series CMOS voltage detectors. Resistors R145, R146 act as a voltage divider so that when voltage presented at pin 1 of the voltage detector U24 is 13-volt DC, pin 3 of the voltage detector U24, which is the OUT pin, remains in a logic-high state as long as the voltage presented at pin 1 is greater than the 13-volt threshold voltage provided by the voltage divider R145, R146. Pin 2 of the voltage detector U24 is coupled to ground. Pin 3 of the voltage detector U24 is coupled to a second terminal of a resistor R144 and a first terminal of the resistor R144 is coupled to a first terminal of a resistor R5, which has a suitable value of about 680 ohms.

A second terminal of the resistor R5 is coupled to a 12-volt voltage source. The first terminal of the resistor R5 is also coupled to the anode of LED 1. The cathode of LED 1 is coupled to the anode of LED 2. The cathode of LED 2 is coupled to the anode of LED 3. The cathode of LED 3 is coupled to ground. Also connected to the 12-volt voltage source is a second terminal of a resistor R6, which has a value suitably of about 680 ohms. A first terminal of the resistor R6 is coupled to the anode of LED 4. The cathode of LED 4 is coupled to the anode of LED 5. The cathode of the LED 5 is coupled to the anode of LED 6, and the cathode of LED 6 is coupled to ground. These LEDs, LED 1-LED 6, act as a bar graph that represents whether power is on and the level of energy remaining in one or more batteries. Preferably, these LEDs, LED 1-LED 6, are selected from green color LEDs selected from Part No. LNJ306G5PUX. These LEDs additionally have a forward voltage of about a 2.0-volt to 2.5-volt drop.

Figure 3:
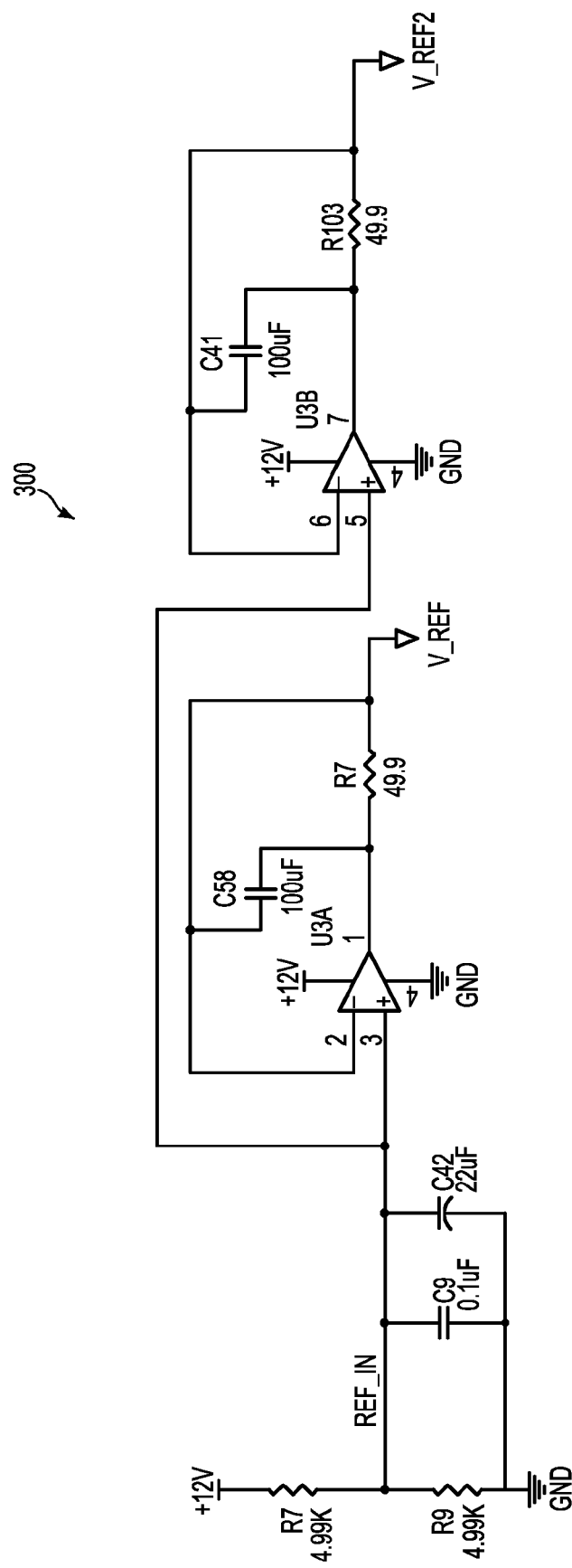
FIG. 3 is a circuit diagram illustrating an exemplary audio reference signal circuitry.
Figures 4A, 4C:
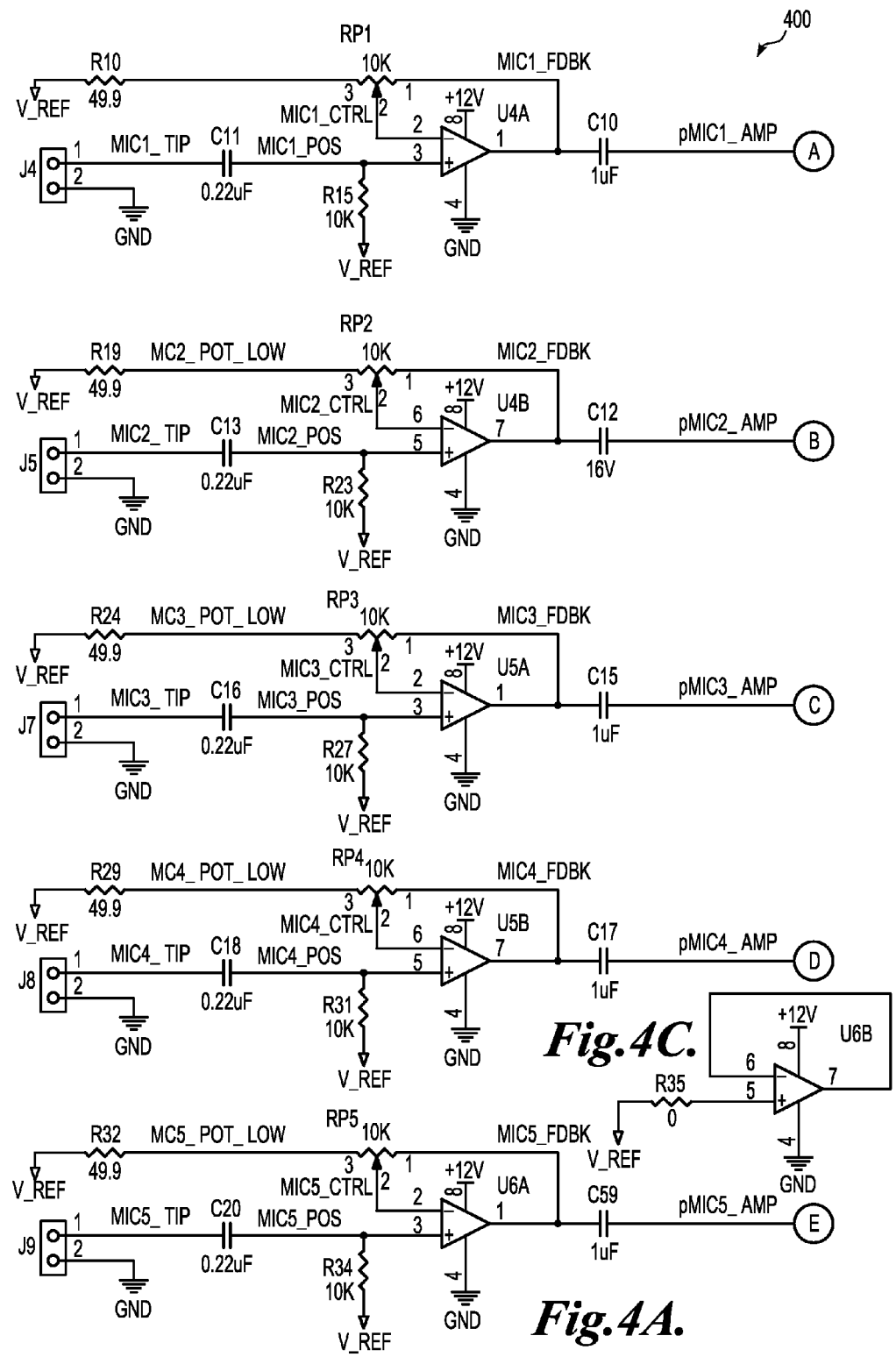
FIGS. 4A-4D are circuit diagram diagrams illustrating an exemplary game communications exchange circuitry.
Figures 4B, 4D:
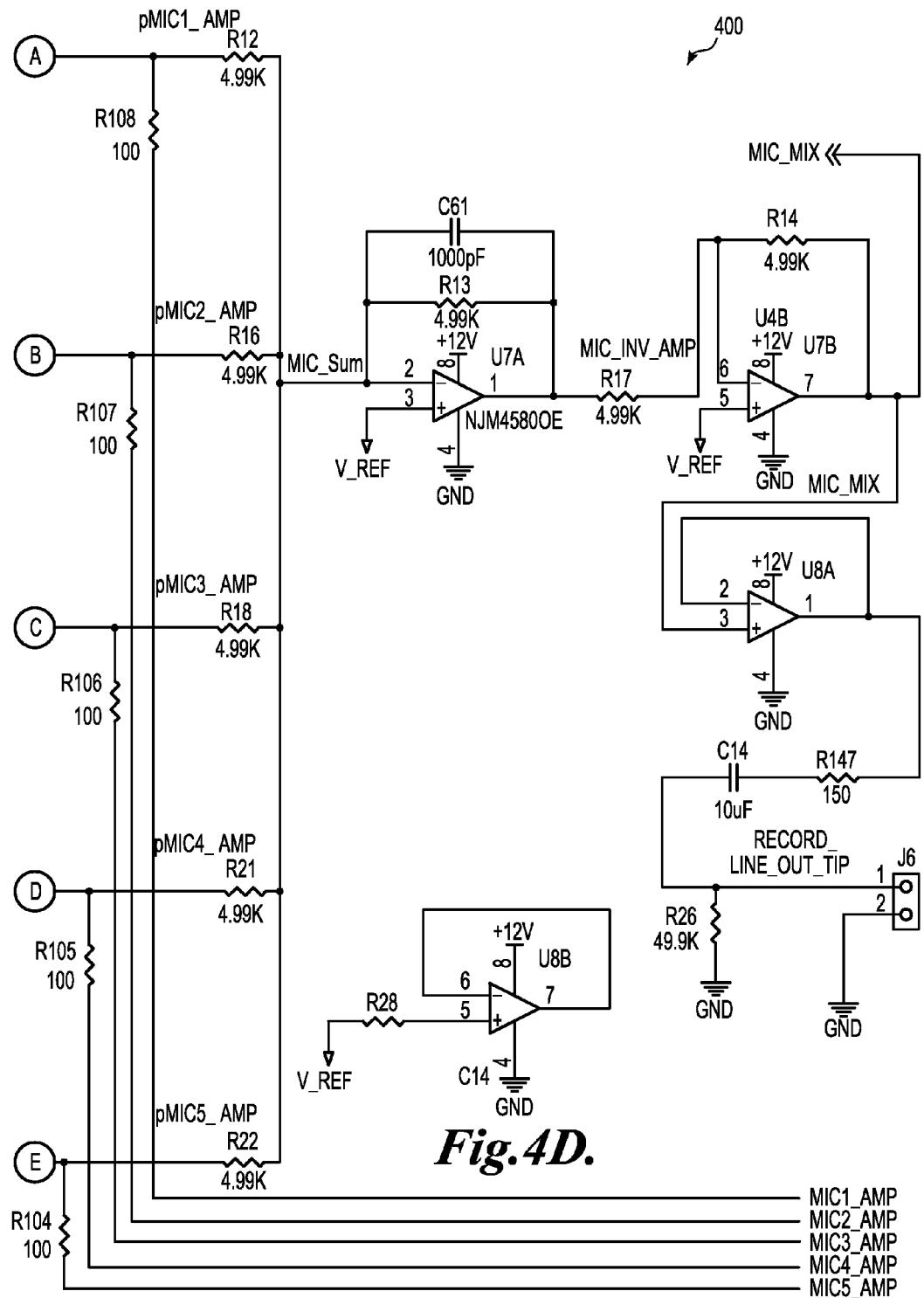
Figure 5A:
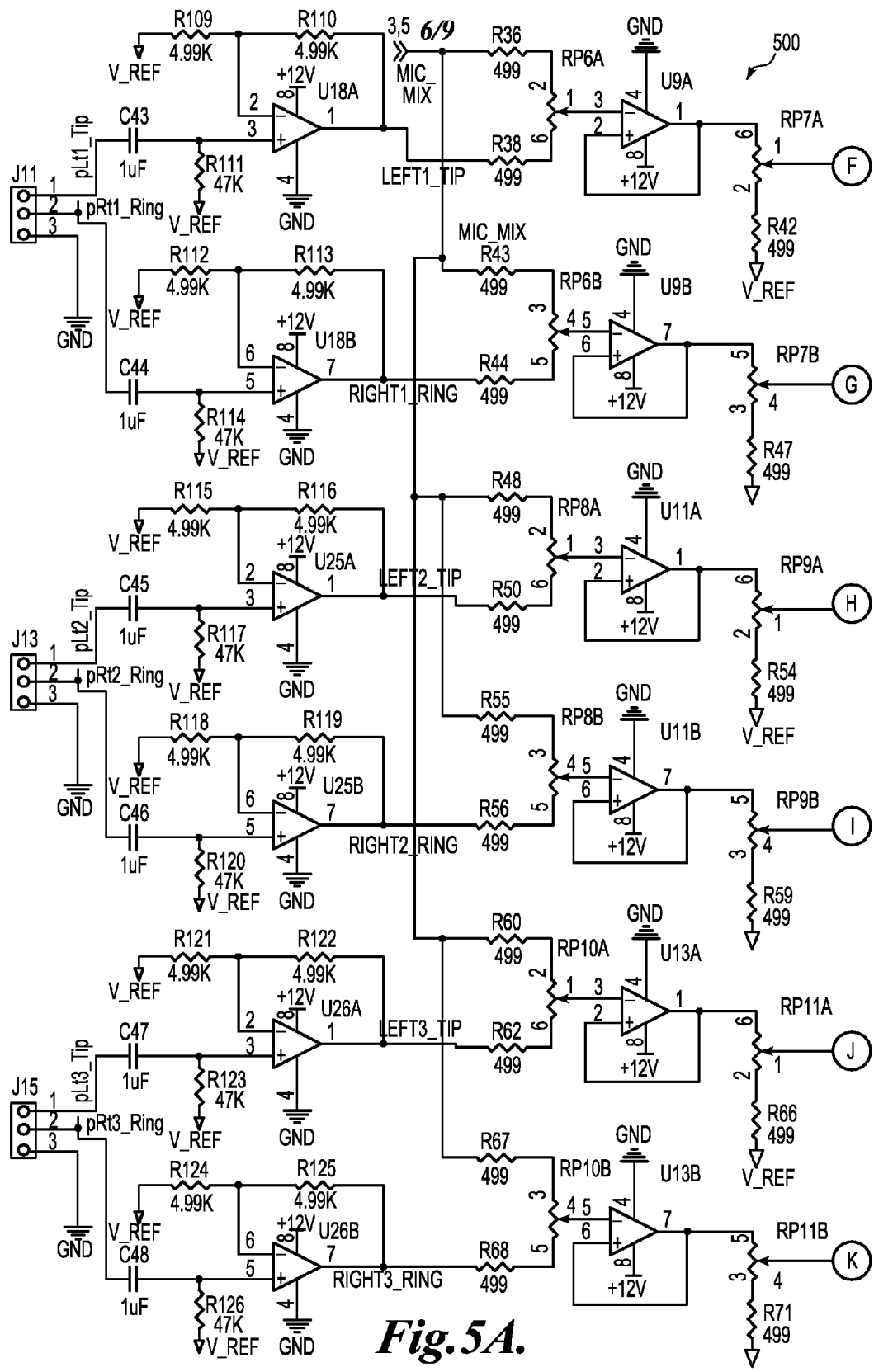
FIGS. 5A-5D are circuit diagrams for illustrating an exemplary audio control circuitry.
Figure 5B:
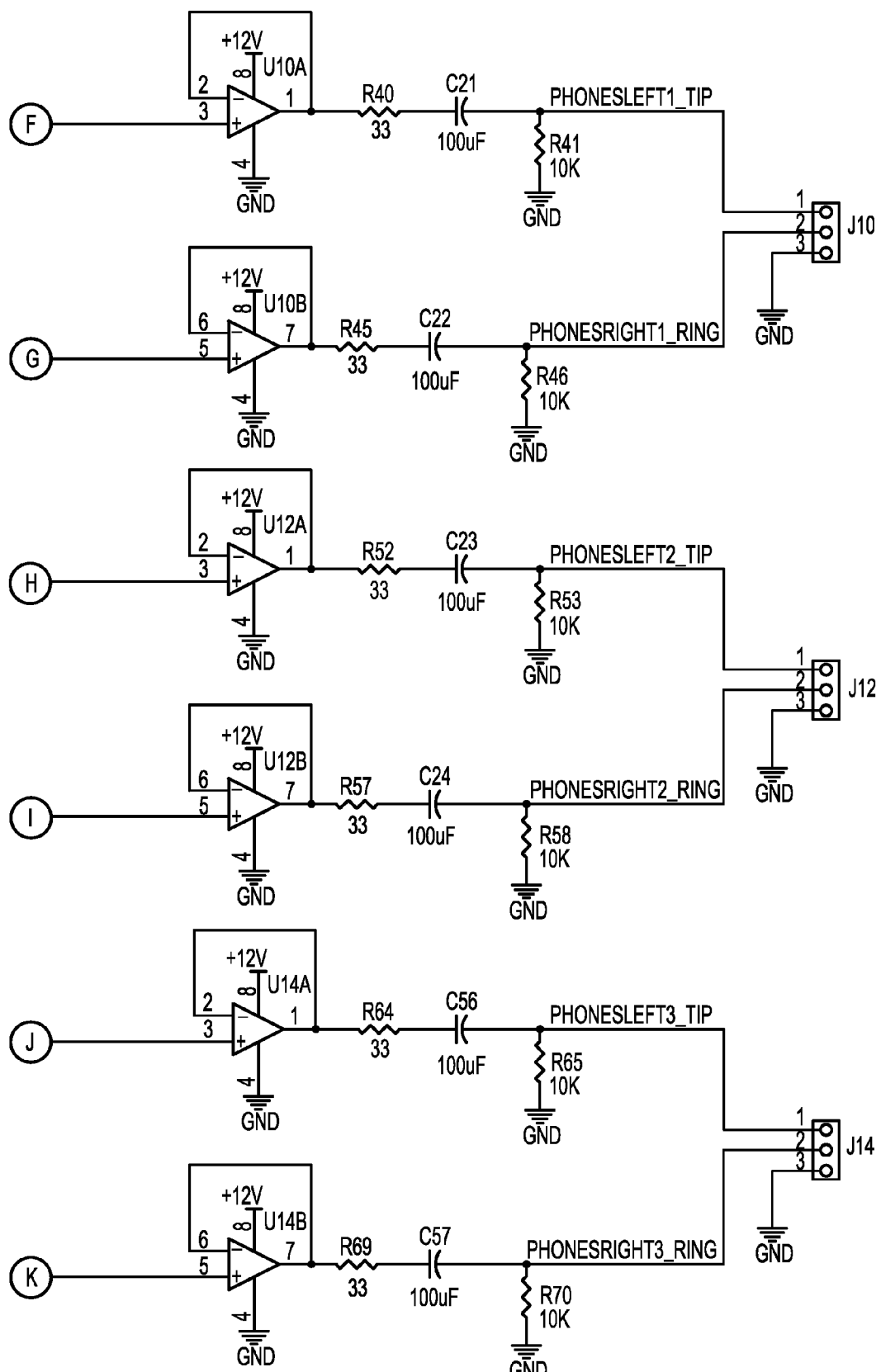
Figure 5C:
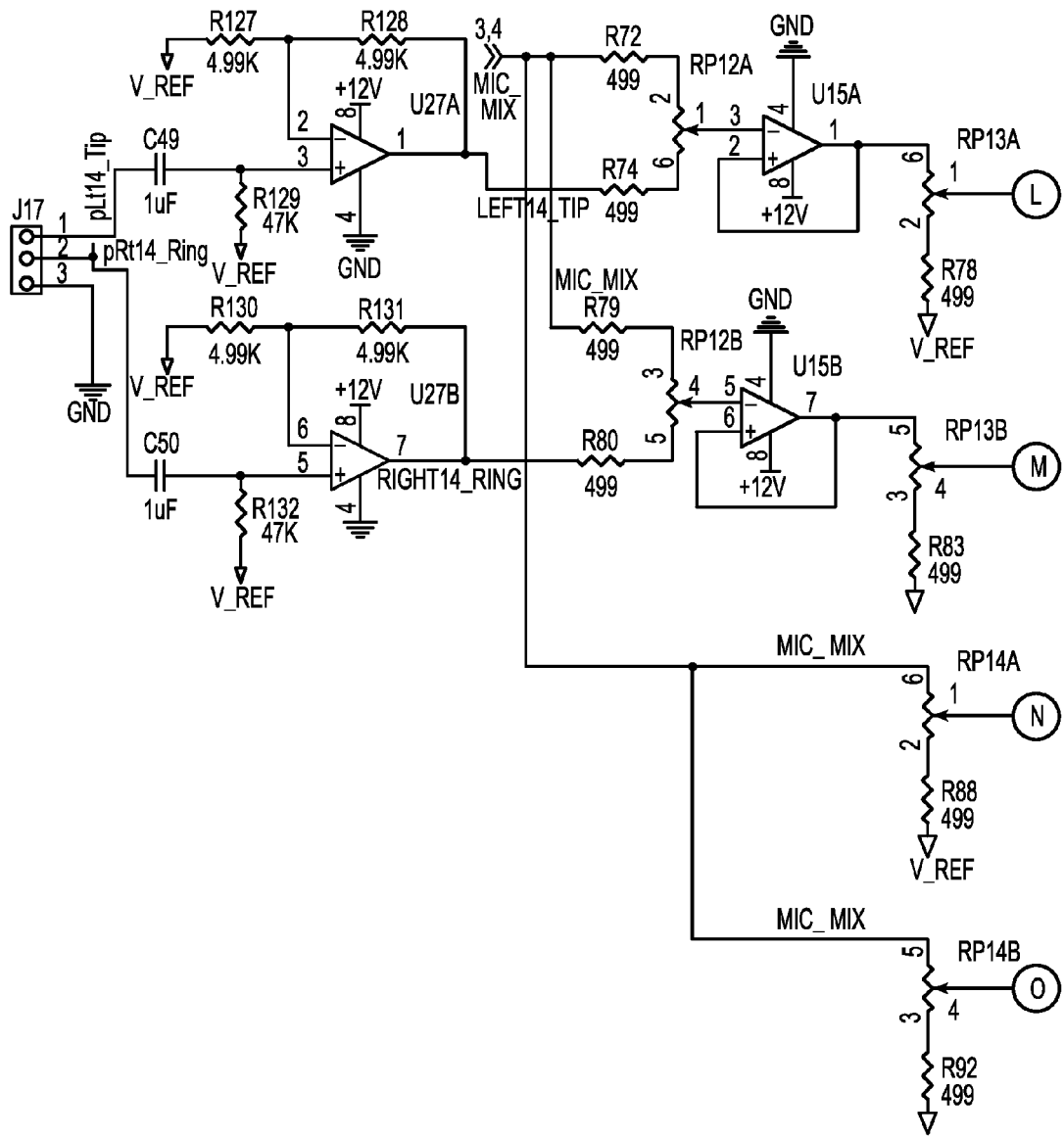
Figure 5D:
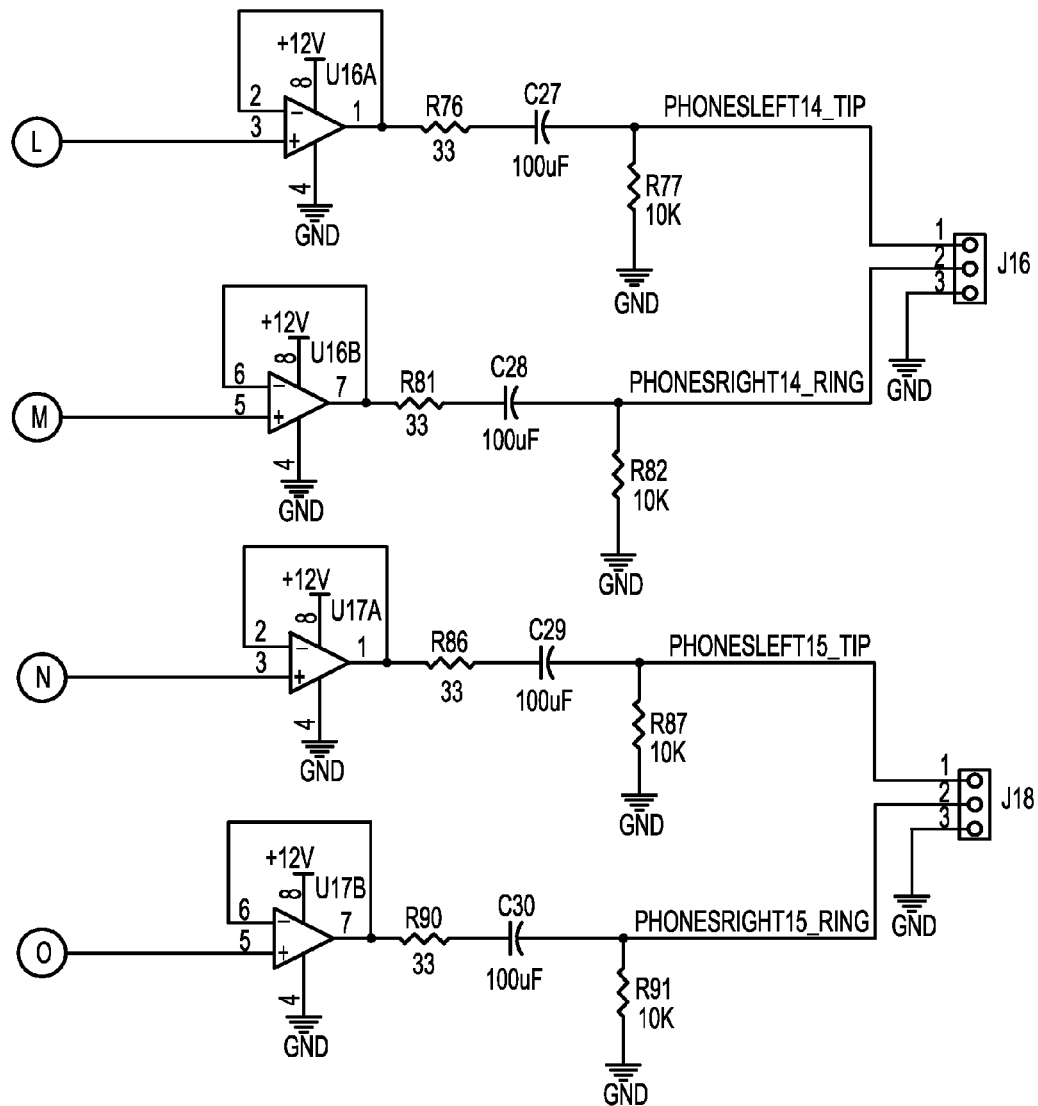

FIG. 3 illustrates a circuit 300 for producing a center voltage reference for subsequent audio processing circuitry in the game communications exchange 104. A 12-volt source is coupled to a second terminal of a resistor R7, which has a suitable value of about 4.99 kilo-ohms. A first terminal of the resistor R7 is coupled to a second terminal of a resistor R9 which has a suitable value of about 4.99 kilo-ohms. A first terminal of the resistor R9 is coupled to ground. Also coupled to ground is a first terminal of a capacitor C9, which has a suitable value of about 0.1 microfarad. A second terminal of the capacitor C9 is coupled to the second terminal of the resistor R9. Also coupled to the second terminal of the capacitor C9 is a first terminal of a capacitor C42, which has a suitable value of about 22 microfarads. A second terminal the capacitor C42 is coupled to ground.

The resistors R7, R9 act as a voltage divider to divide the 12-volt source and present a reference voltage at the terminal 1 of the resistor R7. The capacitors C9, C42 operate to smooth the voltage waveform provided at terminal 1 of the resistor R7. Terminal 1 of the resistor R7 is also coupled to pin 3, which is a positive input to an operational amplifier U3A. Any suitable operational amplifier may be used, such as those associated with industry part number NJM 4556AD. Pin 4 of the operational amplifier U3A is coupled to ground. Pin 8 of the operational amplifier U3A is coupled to a 12-volt source. Pin 1 of the operational amplifier U3A is the output and the output is coupled to a first terminal of a capacitor C58, which has a suitable value of about 100 picofarad. A second terminal of the capacitor C58 is coupled to pin 2 or a negative input terminal of the operational amplifier U3A. The capacitor C58 provides a negative feedback loop to smooth the feedback signal coming back into the operational amplifier U3A.

Coupled to the first terminal of the capacitor C58 is a second terminal of a resistor R8, which has a suitable value of about 49.9 ohms. A first terminal of the resistor R8 is coupled to the second terminal of the capacitor C58. The first terminal of the resistor R8 presents a voltage VREF, which is a center voltage reference for use in subsequent audio circuits. The voltage that is presented at the positive input terminal of the operational amplifier U3A is also presented to pin 5 or a positive input terminal of another operational amplifier U3B. A suitable standardized industry part number for the operational amplifier U3B includes NJM 4556AD.

Pin 4 of the operational amplifier U3B is coupled to ground. Pin 8 of the operational amplifier is coupled to a 12-volt source. Pin 7 is the output of the operational amplifier U3B and it is coupled to a first terminal of a capacitor C41, which has a suitable value of about 100 picofarads. A second terminal of the capacitor C41 is coupled to pin 6 or the negative input terminal of the operational amplifier U3B. The capacitor C41 acts as a feedback loop and also operates to smooth the feedback into the operational amplifier U3B. Coupled to pin 7 or the output of the operational amplifier U3B is a second terminal of a resistor R103, which has a suitable value of about 49.9 ohms. A first terminal of the resistor R103 is coupled to the second terminal of the capacitor C41 and acts as part of the feedback loop. A second reference voltage VREF2 is presented at the first terminal of the resistor R103 and is another center voltage reference signal. Both the reference voltages VREF and VREF2 are about six volts each. The second reference voltage is used for circuitry not directly related to audio circuitry so as to inhibit noise that could be introduced into the audio circuitry.

FIGS. 4A-4D illustrate an exchange circuit to facilitate game communications. A jack J4 is coupled to a first microphone used by one of the game players. The jack J4 has two pins. The second pin is coupled to ground and the first pin which receives audio information is presented to a second terminal of a capacitor C11, which has a suitable value of about 0.22 microfarad. The capacitor C11 acts as a filter for the sound coming in from the microphone to the jack J4. A first terminal of the capacitor C11 is coupled to a second terminal of a resistor R15 which has a suitable value of about 10 kilo-ohms. A first terminal of the resistor R15 is coupled to the VREF signal provided previously by circuit 300.

The second terminal of the resistor R15 is coupled to pin 3 or the positive input terminal of an operational amplifier U4A, which suitably can be chosen with industry standard part number NJM 4580E. A fourth pin of the operational amplifier U4A is coupled to ground and a pin 8 is coupled to a 12-volt source. Pin 1 of the operational amplifier U4A is the output and it is coupled to a first terminal of a potentiometer RP1, which has a suitable value of about 10 kilo-ohms. The potentiometer RP1 is a resistive potentiometer and its purpose is to allow either a gamer or a technician to control the volume of the microphone from zero dB to about 30 dB. A third terminal of the potentiometer RP1 is coupled to a first terminal of a resistor R10, which suitably has a value of about 49.9 ohms. A second terminal of the resistor R10 is coupled to the VREF signal.

The resistor R10 acts to isolate the VREF signal from the potentiometer RP1. A terminal 2 of the potentiometer RP1 is coupled to pin 2 or the negative input terminal of the operational amplifier U4A. The output of the operational amplifier U4A at pin 1 is also coupled to a second terminal of a capacitor C10, which has a suitable value of about 1 microfarad. A first terminal of the capacitor C10 is an output that will be subsequently used in other circuits to present a user interface to the user; it is coupled to a second terminal of resistor R108, which has a suitable value of about 100 ohms and is also coupled to a second terminal of a resistor R12, which has a suitable value of about 4.99 kilo-ohms. Terminal 1 of the resistor R12 is coupled to pin 2 or a negative input terminal of an operational amplifier U7A.

A jack J5 is coupled to a second microphone used by one of the game players. The jack J5 has two pins. The second pin is coupled to ground and the first pin which receives audio information is presented to a second terminal of a capacitor C13, which has a suitable value of about 0.22 microfarad. The capacitor C13 acts as a filter for the sound coming in from the microphone to the jack J5. A first terminal of the capacitor C13 is coupled to a second terminal of a resistor R23 which has a suitable value of about 10 kilo-ohms. A first terminal of the resistor R23 is coupled to the VREF signal provided previously by circuit 300.

The second terminal of the resistor R23 is coupled to pin 5 or the positive input terminal of an operational amplifier U4B, which suitably can be chosen with industry standard part number NJM 4580E. A fourth pin of the operational amplifier U4B is coupled to ground and a pin 8 is coupled to a 12-volt source. Pin 7 of the operational amplifier U4B is the output and it is coupled to a first terminal of a potentiometer RP2, which has a suitable value of about 10 kilo-ohms. The potentiometer RP2 is a resistive potentiometer and its purpose is to allow either a gamer or a technician to control the volume of the microphone from zero dB to about 30 dB. A third terminal of the potentiometer RP2 is coupled to a first terminal of a resistor R19, which suitably has a value of about 49.9 ohms. A second terminal of the resistor R19 is coupled to the VREF signal.

The resistor R19 acts to isolate the VREF signal from the potentiometer RP2. A terminal 2 of the potentiometer RP2 is coupled to pin 6 or the negative input terminal of the operational amplifier U4B. The output of the operational amplifier U4B at pin 7 is also coupled to a second terminal of a capacitor C12, which has a suitable value of about 1 microfarad. A first terminal of the capacitor C12 is an output that will be subsequently used in other circuits to present a user interface to the user; it is an output that will be subsequently used in other circuits to present a user interface to the user, and is coupled to a second terminal of resistor R107, which has a suitable value of about 100 ohms, and is also used to present to a second terminal of a resistor R16, which has a suitable value of about 4.99 kilo-ohms. Terminal 1 of the resistor R16 is coupled to pin 2 or the negative input terminal of the operational amplifier U7A.

A jack J7 is coupled to a third microphone used by one of the game players. The jack J7 has two pins. The second pin is coupled to ground and the first pin which receives audio information is presented to a second terminal of a capacitor C16, which has a suitable value of about 0.22 microfarads. The capacitor C16 acts as a filter for the sound coming in from the microphone to the jack J7. A first terminal of the capacitor C16 is coupled to a second terminal of a resistor R27 which has a suitable value of about 10 kilo-ohms. A first terminal of the resistor R27 is coupled to the VREF signal provided previously by circuit 300.

The second terminal of the resistor R27 is coupled to pin 3 or the positive input terminal of an operational amplifier U5A, which suitably can be chosen with industry standard part number NJM 4580E. A fourth pin of the operational amplifier U5A is coupled to ground and a pin 8 is coupled to a 12-volt source. Pin 1 of the operational amplifier U5A is the output and it is coupled to a first terminal of a potentiometer RP3, which has a suitable value of about 10 kilo-ohms. The potentiometer RP3 is a resistive potentiometer and its purpose is to allow either a gamer or a technician to control the volume of the microphone from zero dB to about 30 dB. A third terminal of the potentiometer RP3 is coupled to a first terminal of a resistor R24, which suitably has a value of about 49.9 ohms. A second terminal of the resistor R24 is coupled to the VREF signal.

The resistor R24 acts to isolate the VREF signal from the potentiometer RP3. A terminal 2 of the potentiometer RP3 is coupled to pin 2 or the negative input terminal of the operational amplifier U5A. The output of the operational amplifier U5A at pin 1 is also coupled to a second terminal of a capacitor C15, which has a suitable value of about 1 microfarad. A first terminal of the capacitor C15 is an output that will be subsequently used in other circuits to present a user interface to the user; it is coupled to a second terminal of resistor R106, which has a suitable value of about 100 ohms and is also used to present to a second terminal of a resistor R18, which has a suitable value of about 4.99 kilo-ohms. Terminal 1 of the resistor R18 is coupled to pin 2 or the negative input terminal of the operational amplifier U7A.

A jack J8 is coupled to a fourth microphone used by one of the game players. The jack J8 has two pins. The second pin is coupled to ground and the first pin (which receives audio information) is presented to a second terminal of a capacitor C18, which has a suitable value of about 0.22 microfarad. The capacitor C18 acts as a filter for the sound coming in from the microphone to the jack J8. A first terminal of the capacitor C18 is coupled to a second terminal of a resistor R31 which has a suitable value of about 10 kilo-ohms. A first terminal of the resistor R31 is coupled to the VREF signal provided previously by circuit 300.

The second terminal of the resistor R31 is coupled to pin 5 or the positive input terminal of an operational amplifier U5B, which suitably can be chosen with industry standard part number NJM 4580E. A fourth pin of the operational amplifier U5B is coupled to ground and a pin 8 is coupled to a 12-volt source. Pin 7 of the operational amplifier U5B is the output and it is coupled to a first terminal of a potentiometer RP4, which has a suitable value of about 10 kilo-ohms. The potentiometer RP4 is a resistive potentiometer and its purpose is to allow either a gamer or a technician to control the volume of the microphone from zero dB to about 30 dB. A third terminal of the potentiometer RP4 is coupled to a first terminal of a resistor R29, which suitably has a value of about 49.9 ohms. A second terminal of the resistor R29 is coupled to the VREF signal.

The resistor R29 acts to isolate the VREF signal from the potentiometer RP4. A terminal 2 of the potentiometer RP4 is coupled to pin 6 or the negative input terminal of the operational amplifier U5B. The output of the operational amplifier U5B at pin 7 is also coupled to a second terminal of a capacitor C17, which has a suitable value of about 1 microfarad. A first terminal of the capacitor C17 is an output that will be subsequently used in other circuits to present a user interface to the user; it is coupled to a second terminal of resistor R105, which has a suitable value of about 100 ohms, and is also used to present to a second terminal of a resistor R21, which has a suitable value of about 4.99 kilo-ohms. Terminal 1 of the resistor R21 is coupled to pin 2 or the negative input terminal of the operational amplifier U7A.

A jack J9 is coupled to a fifth microphone used by a game technician. The jack J9 has two pins. The second pin is coupled to ground and the first pin which receives audio information is presented to a second terminal of a capacitor C20, which has a suitable value of about 0.22 microfarad. The capacitor C20 acts as a filter for the sound coming in from the microphone to the jack J9. A first terminal of the capacitor C20 is coupled to a second terminal of a resistor R34 which has a suitable value of about 10 kilo-ohms. A first terminal of the resistor R34 is coupled to the VREF signal provided previously by circuit 300.

The second terminal of the resistor R34 is coupled to pin 3 or the positive input terminal of an operational amplifier U6A, which suitably can be chosen with industry standard part number NJM 4580E. A fourth pin of the operational amplifier U6A is coupled to ground and a pin 8 is coupled to a 12-volt source. Pin 1 of the operational amplifier U6A is the output and it is coupled to a first terminal of a potentiometer RP5, which has a suitable value of about 10 kilo-ohms. The potentiometer RP5 is a resistive potentiometer and its purpose is to allow either a gamer or a technician to control the volume of the microphone from zero dB to about 30 dB. A third terminal of the potentiometer RP5 is coupled to a first terminal of a resistor R32, which suitably has a value of about 49.9 ohms. A second terminal of the resistor R32 is coupled to the VREF signal.

The resistor R32 acts to isolate the VREF signal from the potentiometer RP5. A terminal 2 of the potentiometer RP5 is coupled to pin 2 or the negative input terminal of the operational amplifier U6A. The output of the operational amplifier U6A at pin 1 is also coupled to a second terminal of a capacitor C59, which has a suitable value of about 1 microfarad. A first terminal of the capacitor C59 is an output that will be subsequently used in other circuits to present a user interface to the user; it is coupled to a second terminal of resistor R104, which has a suitable value of about 100 ohms, and is also used to present to a second terminal of a resistor R22, which has a suitable value of about 4.99 kilo-ohms. Terminal 1 of the resistor R22 is coupled to pin 2 or the negative input terminal of the operational amplifier U7A.

The operational amplifier U7A has a suitable industry standard part number NJM 4580E. Pin 3 or the positive input terminal of the operational amplifier U7A is coupled to the VREF signal. Pin 4 of the operational amplifier is coupled to ground. Pin 8 of the operational amplifier is coupled to a 12-volt source. Pin 1 of the operational amplifier U7A is also the output of the operational amplifier and is coupled to terminal 1 of a resistor R13, which has a suitable value of about 4.99 kilo-ohms. A second terminal of the resistor R13 is coupled to pin 2 of the operational amplifier U7A. The second terminal of the resistor R13 is also coupled to a second terminal of a capacitor C61, which has a suitable value of about 1,000 picofarads. Terminal 1 of the capacitor C61 is coupled to terminal 1 of the resistor R13.

Pin 1 or the output of the operational amplifier U7A is coupled to a second terminal of a resistor R17 which has a suitable value of about 4.99 kilo-ohms. Terminal 1 of the resistor R17 is coupled to pin 6 or the negative input terminal of an operational amplifier U7B. Pin 5 or the positive input terminal of the operational amplifier U7B is coupled to the VREF signal. Pin 4 of the operational amplifier U7B is coupled to ground whereas pin 8 of the operational amplifier U7B is coupled to a 12-volt source. Pin 7 of the operational amplifier is also the output and is coupled to terminal 1 of the resistor R14, which has a suitable value of about 4.99 kilo-ohms. Terminal 2 of the resistor R14 is coupled to pin 6, which is the negative input terminal of the operational amplifier U7B.

The operational amplifier U7B acts as an inverter to invert the signal coming from the terminal 1 of the resistor R17. The output is presented at pin 7 and will be presented to a balance control circuitry for the game communications exchange 104. The output of the operational amplifier U7B of pin 7 is also coupled to pin 3 or the positive input terminal of an operational amplifier U8A, which suitably is selected with standardized industry part number NJM 4580E. Pin 4 of the operational amplifier U8A is coupled to ground and pin 8 is coupled to a 12-volt source. Pin 1 is the output of the operational amplifier U8A is also coupled to pin 2 which is the negative input terminal of the operational amplifier U8A.

Pin 1 or the output of the operational amplifier U8A is also coupled to a second terminal of a resistor R147, which suitably has a value of about 150 ohms. Terminal 1 of the resistor R147 is coupled to terminal 2 of a capacitor C14, which suitably has a value of about 10 microfarad. Terminal 1 of the capacitor C14 is coupled to a second terminal of resistor R26, which suitably has a value of about 49.9 kilo-ohms. Terminal 1 of the resistor R26 is coupled to ground. Terminal 2 of the resistor R26 is coupled to a jack J6, which can be coupled to recording instruments so as to provide an audio record of the communications of gamers playing a game. The jack J6 is suitably a two-pin jack. Pin 1 of the jack J6 is coupled to the second terminal of the resistor R26 and pin 2 is coupled to ground.

FIGS. 5A-5D illustrate circuitry 500 for controlling audio information provided by gamers and audio information provided by game consoles to an output device such as television sets 108a-108d. A jack J11 preferably has three pins which are coupled externally to a television set. Pin 3 is coupled to ground. Pin 2 is coupled to a second terminal of a capacitor C44, which has a suitable value of about one microfarad. Terminal 1 of the capacitor C44 is coupled to terminal 1 of a resistor R114, which has a suitable value of about 47 kilo-ohms. Terminal 2 of the resistor R114 is coupled to the VREF signal.

Terminal 1 of the resistor R114 is also coupled to pin 5 or the positive input terminal of an operational amplifier U18B, which suitably is selected with standardized industry part number NJM 4580E. Pin 4 of the operational amplifier U18B is coupled to ground and pin 8 is coupled to a 12-volt source. Pin 7 or the output of the operational amplifier U18B presents right-hand side audio information. Pin 7 of the operational amplifier U18B is coupled to terminal 1 of a resistor R113, which suitably has a value of about 4.99 kilo-ohms. Terminal 2 of the resistor R113 is coupled to pin 6 or the negative input terminal of the operational amplifier U18B. Terminal 2 of the resistor R113 is also coupled to terminal 1 of a resistor R112, which suitably has a value of about 4.99 kilo-ohms. Terminal 2 of the resistor R112 is coupled to the VREF signal. The output of the operational amplifier U18B is also presented to terminal 2 of a resistor R44, which suitably has a value of about 499 ohms. Terminal 1 of the resistor R44 is coupled to terminal 5 of a potentiometer RP6B, which suitably has a value of about 10 kilo-ohms.

Pin 1 of the jack J11 is coupled to terminal 2 of a capacitor C43, which suitably has a value of about 1 microfarad. Terminal 1 of the capacitor C43 is coupled to terminal 1 of a resistor R111, which suitably has a value of about 47 kilo-ohms. Terminal 2 of the resistor R111 is coupled to the VREF signal. Terminal 1 of the resistor R111 is coupled to pin 3 or the positive input terminal of an operational amplifier U18A. Pin 4 of the operational amplifier U18A is coupled to ground and pin 8 is coupled to a 12-volt source. Pin 1 of the operational amplifier U18A is an output of the operational amplifier and the operational amplifier is suitably selected with standardized industry part number NJM 4580E. Pin 1 of the operational amplifier U18A is also coupled to terminal 1 of a resistor R110, which suitably has a value of about 4.99 kilo-ohms. Terminal 2 of the resistor R110 is coupled to pin 2 or the negative input terminal of the operational amplifier U18A. Terminal 2 of the resistor R110 is coupled to terminal 1 of a resistor R109, which suitably has a value of about 4.99 kilo-ohms. Terminal 2 of the resistor R109 is coupled to the VREF signal.

Terminal 1 or the output of the operational amplifier U18A is coupled to a second terminal of a resistor R38, which suitably has a value of about 499 ohms. Terminal 1 of the resistor R38 is coupled to terminal 6 of a potentiometer RP6A, which suitably has a value of about 10 kilo-ohms. Terminal 2 of the potentiometer RP6A is coupled to terminal 1 of a resistor R36, which suitably has a value of about 499 ohms. Terminal 2 of the resistor R36 receives signal information from pin 7 or the output of the operational amplifier U7B, as previously discussed in FIG. 4. The signal that is presented to terminal 2 of the resistor R36 can be defined as the microphone exchange signal. The microphone exchange signal is also introduced to terminal 2 of a resistor R43, which suitably has a value of about 499 ohms. Terminal 1 of the resistor R43 is coupled to pin 3 of the potentiometer RP6B.

The potentiometers RP6A, RP6B can be used to adjust the balance of game audio information and microphone audio information. Pin 4 of the potentiometer RP6B is the output of the potentiometer RP6B and is presented to pin 5 or the positive input terminal of an operational amplifier U9B, which suitably is selected from a standardized industry part number NJM 4580E. Pin 4 of the operational amplifier U9B is coupled to ground and pin 8 is coupled to a 12-volt source. Pin 7 or the output of the operational amplifier U9B is coupled to pin 6 or the negative input terminal of the operational amplifier U9B. Pin 7 of the operational amplifier is also coupled to pin 5 of another potentiometer RP7B, which suitably has a value of about 50 kilo-ohms. Pin 3 of the potentiometer RP7B is coupled to terminal 2 of resistor R47, which suitably has a value of about 499 ohms. Terminal 1 the resistor R47 is coupled to the VREF signal.

Terminal 4 of the potentiometer RP7B is the output of the potentiometer and is coupled to terminal 5 or the positive input terminal of an operational amplifier U10B. Terminal 4 of the operational amplifier U10B is coupled to ground and terminal 8 of the operational amplifier is coupled to a 12-volt source. Terminal 7 of the operational amplifier U10B is the output and the operational amplifier U10B is suitably selected with standardized industry part number NJM 4556AD. Terminal 7 of the operational amplifier is coupled to terminal 6 or the negative input terminal of the operational amplifier U10B. Terminal 7 of the operational amplifier U10B is also coupled to terminal 2 of a resistor R45, which suitably has a value of about 33 ohms. Terminal 1 of the resistor R45 is coupled to terminal 1 of a capacitor C22, which suitably has a value of about 100 microfarad. Terminal 2 of the capacitor C22 is coupled to terminal 2 of resistor R46, which suitably has a value of about 10 kilo-ohms. Terminal 1 of the resistor R46 is coupled to ground. Terminal 2 of the resistor R46 is also coupled to pin 2 of a jack J10, which is coupled to a pair of gamer headphones, such as those of a first gamer. Pin 2 provides right-hand audio information.

Pin 1 of the potentiometer RP6A is the output of the potentiometer RP6A and is presented to pin 3 or the positive input terminal of an operational amplifier U9A, which suitably is selected with standardized industry part number NJM 4580E. Pin 4 of the operational amplifier U9A is coupled to ground and pin 8 is coupled to a 12-volt source. Pin 1 or the output of the operational amplifier U9A is coupled to pin 2 or the negative input terminal of the operational amplifier U9A. Pin 1 of the operational amplifier is also coupled to pin 6 of another potentiometer RP7A, which suitably has a value of about 50 kilo-ohms.

Terminal 2 of the potentiometer RP7A is coupled to terminal 2 of resistor R42, which suitably has a value of about 499 ohms. Terminal 1 of the resistor R42 is coupled to the VREF signal. Terminal 1 of the potentiometer RP7A is coupled to terminal 3 or the positive input terminal of an operational amplifier U10A, which suitably is selected with standardized industry part number NJM 4556AD. Terminal 1 of the operational amplifier U10A is the output of the operational amplifier and is coupled to pin 2, which is the negative input terminal of the operational amplifier. Pin 4 of the operational amplifier U10A is coupled to ground and pin 8 of the operational amplifier is coupled to a 12-volt source. Terminal 1 of the operational amplifier U10A is coupled to terminal 2 of a resistor R40, which suitably has a value of about 33 ohms. Terminal 1 of the resistor R40 is coupled to terminal 1 of a capacitor C21, which suitably has a value of about 100 microfarads. Terminal 2 of the capacitor C21 is coupled to terminal 2 of resistor R41, which suitably has a value of about 10 kilo-ohms. Terminal 1 of resistor R41 is coupled to ground. Terminal 2 of the resistor R41 is also coupled to terminal 1 of the jack J10, which is coupled to the left audio signal distribution of the gamer headphones.

A jack J13 preferably has three pins which are coupled externally to a television set. Pin 3 is coupled to ground. Pin 2 is coupled to a second terminal of a capacitor C46, which has a suitable value of about one microfarad. Terminal 1 of the capacitor C46 is coupled to terminal 1 of a resistor R120, which has a suitable value of about 47 kilo-ohms. Terminal 2 of the resistor R120 is coupled to the VREF signal.

Terminal 1 of the resistor R120 is also coupled to pin 5 or the positive input terminal of an operational amplifier U25B, which suitably is selected with standardized industry part number NJM 4580E. Pin 4 of the operational amplifier U25B is coupled to ground and pin 8 is coupled to a 12-volt source. Pin 7 or the output of the operational amplifier U25B presents right-hand side audio information. Pin 7 of the operational amplifier U25B is coupled to terminal 1 of a resistor R119, which suitably has a value of about 4.99 kilo-ohms. Terminal 2 of the resistor R119 is coupled to pin 6 or the negative input terminal of the operational amplifier U25B. Terminal 2 of the resistor R119 is also coupled to terminal 1 of a resistor R116, which suitably has a value of about 4.99 kilo-ohms. Terminal 2 of the resistor R116 is coupled to the VREF signal. The output of the operational amplifier U25B is also presented to terminal 2 of a resistor R56, which suitably has a value of about 499 ohms. Terminal 1 of the resistor R56 is coupled to terminal 5 of a potentiometer RP8B, which suitably has a value of about 10 kilo-ohms.

Pin 1 of the jack J13 is coupled to terminal 2 of a capacitor C45, which suitably has a value of about 1 microfarad. Terminal 1 of the capacitor C45 is coupled to terminal 1 of a resistor R117, which suitably has a value of about 47 kilo-ohms. Terminal 2 of the resistor R117 is coupled to the VREF signal. Terminal 1 of the resistor R117 is coupled to pin 3 or the positive input terminal of an operational amplifier U25A. Pin 4 of the operational amplifier U25A is coupled to ground and pin 8 is coupled to a 12-volt source. Pin 1 of the operational amplifier U25A is an output of the operational amplifier and the operational amplifier is suitably selected with standardized industry part number NJM 4580E. Pin 1 of the operational amplifier U25A is also coupled to terminal 1 of a resistor R116, which suitably has a value of about 4.99 kilo-ohms. Terminal 2 of the resistor R116 is coupled to pin 2 or the negative input terminal of the operational amplifier U25A. Terminal 2 of the resistor R116 is coupled to terminal 1 of a resistor R115, which suitably has a value of about 4.99 kilo-ohms. Terminal 2 of the resistor R115 is coupled to the VREF signal.

Terminal 1 or the output of the operational amplifier U25A is coupled to a second terminal of a resistor R50, which suitably has a value of about 499 ohms. Terminal 1 of the resistor R50 is coupled to terminal 6 of a potentiometer RP8A, which suitably has a value of about 10 kilo-ohms. Terminal 2 of the potentiometer RP8A is coupled to terminal 1 of a resistor R48, which suitably has a value of about 499 ohms. Terminal 2 of the resistor R48 receives signal information from pin 7 or the output of the operational amplifier U7B as previously discussed in FIG. 4. The signal that is presented to terminal 2 of the resistor R48 can be defined as the microphone exchange signal. The microphone exchange signal is also introduced to terminal 2 of a resistor R55, which suitably has a value of about 499 ohms. Terminal 1 of the resistor R55 is coupled to pin 3 of the potentiometer RP8B.

The potentiometers RP8A, RP8B can be used to adjust the balance of game audio information and microphone audio information. Pin 4 of the potentiometer RP8B is the output of the potentiometer RP8B and is presented to pin 5 or the positive input terminal of an operational amplifier U11B, which suitably is selected with standardized industry part number NJM 4580E. Pin 4 of the operational amplifier U11B is coupled to ground and pin 8 is coupled to a 12-volt source. Pin 7 or the output of the operational amplifier U11B is coupled to pin 6 or the negative input terminal of the operational amplifier U11B. Pin 7 of the operational amplifier is also coupled to pin 5 of another potentiometer RP9B, which suitably has a value of about 50 kilo-ohms. Pin 3 of the potentiometer RP9B is coupled to terminal 2 of resistor R59, which suitably has a value of about 499 ohms. Terminal 1 of the resistor R59 is coupled to the VREF signal.

Terminal 4 of the potentiometer RP9B is the output of the potentiometer and is coupled to terminal 5 or the positive input terminal of an operational amplifier U12B. Terminal 4 of the operational amplifier U12B is coupled to ground and terminal 8 of the operational amplifier is coupled to a 12-volt source. Terminal 7 of the operational amplifier U12B is the output and the operational amplifier U12B is suitably selected with standardized industry part number NJM 4556AD. Terminal 7 of the operational amplifier is coupled to terminal 6 or the negative input terminal of the operational amplifier U12B. Terminal 7 of the operational amplifier U12B is also coupled to terminal 2 of a resistor R57, which suitably has a value of about 33 ohms. Terminal 1 of the resistor R57 is coupled to terminal 1 of a capacitor C24, which suitably has a value of about 100 microfarad. Terminal 2 of the capacitor C24 is coupled to terminal 2 of resistor R58, which suitably has a value of about 10 kilo-ohms. Terminal 1 of the resistor R58 is coupled to ground. Terminal 2 of the resistor R58 is also coupled to pin 2 of a jack J12, which is coupled to a pair of gamer headphones, such as those of a first gamer. Pin 2 provides right-hand audio information.

Pin 1 of the potentiometer RP8A is the output of the potentiometer RP8A and is presented to pin 3 or the positive input terminal of an operational amplifier U11A, which suitably is selected with standardized industry part number NJM 4580E. Pin 4 of the operational amplifier U11A is coupled to ground and pin 8 is coupled to a 12-volt source. Pin 1 or the output of the operational amplifier U11A is coupled to pin 2 or the negative input terminal of the operational amplifier U11A. Pin 1 of the operational amplifier is also coupled to pin 6 of another potentiometer RP9A, which suitably has a value of about 50 kilo-ohms.

Terminal 2 of the potentiometer RP9A is coupled to terminal 2 of resistor R54, which suitably has a value of about 499 ohms. Terminal 1 of the resistor R54 is coupled to the VREF signal. Terminal 1 of the potentiometer RP9A is coupled to terminal 3 or the positive input terminal of an operational amplifier U12A, which suitably is selected with standardized industry part number NJM 4556AD. Terminal 1 of the operational amplifier U12A is the output of the operational amplifier and is coupled to pin 2, which is the negative input terminal of the operational amplifier. Pin 4 of the operational amplifier U12A is coupled to ground and pin 8 of the operational amplifier is coupled to a 12-volt source. Terminal 1 of the operational amplifier U12A is coupled to terminal 2 of a resistor R52, which suitably has a value of about 33 ohms. Terminal 1 of the resistor R52 is coupled to terminal 1 of a capacitor C23, which suitably has a value of about 100 microfarads. Terminal 2 of the capacitor C23 is coupled to terminal 2 of resistor R53, which suitably has a value of about 10 kilo-ohms. Terminal 1 of resistor R53 is coupled to ground. Terminal 2 of the resistor R53 is also coupled to terminal 1 of the jack J12, which is coupled to the left audio signal distribution of the gamer headphones.

A jack J15 preferably has three pins which are coupled externally to a television set. Pin 3 is coupled to ground. Pin 2 is coupled to a second terminal of a capacitor C48, which has a suitable value of about one microfarad. Terminal 1 of the capacitor C48 is coupled to terminal 1 of a resistor R126, which has a suitable value of about 47 kilo-ohms. Terminal 2 of the resistor R126 is coupled to the VREF signal.

Terminal 1 of the resistor R126 is also coupled to pin 5 or the positive input terminal of an operational amplifier U26B, which suitably is selected with standardized industry part number NJM 4580E. Pin 4 of the operational amplifier U26B is coupled to ground and pin 8 is coupled to a 12-volt source. Pin 7 or the output of the operational amplifier U26B presents right-hand side audio information. Pin 7 of the operational amplifier U26B is coupled to terminal 1 of a resistor R125, which suitably has a value of about 4.99 kilo-ohms. Terminal 2 of the resistor R125 is coupled to pin 6 or the negative input terminal of the operational amplifier U26B. Terminal 2 of the resistor R125 is also coupled to terminal 1 of a resistor R124, which suitably has a value of about 4.99 kilo-ohms. Terminal 2 of the resistor R124 is coupled to the VREF signal. The output of the operational amplifier U26B is also presented to terminal 2 of a resistor R68, which suitably has a value of about 499 ohms. Terminal 1 of the resistor R68 is coupled to terminal 5 of a potentiometer RP10B, which suitably has a value of about 10 kilo-ohms.

Pin 1 of the jack J15 is coupled to terminal 2 of a capacitor C47, which suitably has a value of about 1 microfarad. Terminal 1 of the capacitor C47 is coupled to terminal 1 of a resistor R123, which suitably has a value of about 47 kilo-ohms. Terminal 2 of the resistor R123 is coupled to the VREF signal. Terminal 1 of the resistor R123 is coupled to pin 3 or the positive input terminal of an operational amplifier U26A. Pin 4 of the operational amplifier U26A is coupled to ground and pin 8 is coupled to a 12-volt source. Pin 1 of the operational amplifier U26A is an output of the operational amplifier and the operational amplifier is suitably selected with standardized industry part number NJM 4580E. Pin 1 of the operational amplifier U26A is also coupled to terminal 1 of a resistor R122, which suitably has a value of about 4.99 kilo-ohms. Terminal 2 of the resistor R122 is coupled to pin 2 or the negative input terminal of the operational amplifier U26A. Terminal 2 of the resistor R122 is coupled to terminal 1 of a resistor R121, which suitably has a value of about 4.99 kilo-ohms. Terminal 2 of the resistor R121 is coupled to the VREF signal.

Terminal 1 or the output of the operational amplifier U26A is coupled to a second terminal of a resistor R62, which suitably has a value of about 499 ohms. Terminal 1 of the resistor R62 is coupled to terminal 6 of a potentiometer RP10A, which suitably has a value of about 10 kilo-ohms. Terminal 2 of the potentiometer RP10A is coupled to terminal 1 of a resistor R60, which suitably has a value of about 499 ohms. Terminal 2 of the resistor R60 receives signal information from pin 7 or the output of the operational amplifier U7B as previously discussed in FIG. 4. The signal that is presented to terminal 2 of the resistor R60 can be defined as the microphone exchange signal. The microphone exchange signal is also introduced to terminal 2 of a resistor R67, which suitably has a value of about 499 ohms. Terminal 1 of the resistor R67 is coupled to pin 3 of the potentiometer RP10B.

The potentiometers RP10A, RP10B can be used to adjust the balance of game audio information and microphone audio information. Pin 4 of the potentiometer RP10B is the output of the potentiometer RP10B and is presented to pin 5 or the positive input terminal of an operational amplifier U13B, which suitably is selected with standardized industry part number NJM 4580E. Pin 4 of the operational amplifier U13B is coupled to ground and pin 8 is coupled to a 12-volt source. Pin 7 or the output of the operational amplifier U13B is coupled to pin 6 or the negative input terminal of the operational amplifier U13B. Pin 7 of the operational amplifier is also coupled to pin 5 of another potentiometer RP11B, which suitably has a value of about 50 kilo-ohms. Pin 3 of the potentiometer RP11B is coupled to terminal 2 of resistor R71, which suitably has a value of about 499 ohms. Terminal 1 of the resistor R71 is coupled to the VREF signal.

Terminal 4 of the potentiometer RP11B is the output of the potentiometer and is coupled to terminal 5 or the positive input terminal of an operational amplifier U14B. Terminal 4 of the operational amplifier U14B is coupled to ground and terminal 8 of the operational amplifier is coupled to a 12-volt source. Terminal 7 of the operational amplifier U14B is the output and the operational amplifier U14B is suitably selected with standardized industry part number NJM 4556AD. Terminal 7 of the operational amplifier is coupled to terminal 6 or the negative input terminal of the operational amplifier U14B. Terminal 7 of the operational amplifier U14B is also coupled to terminal 2 of a resistor R69, which suitably has a value of about 33 ohms. Terminal 1 of the resistor R69 is coupled to terminal 1 of a capacitor C57, which suitably has a value of about 100 microfarad. Terminal 2 of the capacitor C57 is coupled to terminal 2 of resistor R70, which suitably has a value of about 10 kilo-ohms. Terminal 1 of the resistor R70 is coupled to ground. Terminal 2 of the resistor R70 is also coupled to pin 2 of a jack J14, which is coupled to a pair of gamer headphones, such as those of a first gamer. Pin 2 provides right-hand audio information.

Pin 1 of the potentiometer RP10A is the output of the potentiometer RP10A and is presented to pin 3 or the positive input terminal of an operational amplifier U13A, which suitably is selected with standardized industry part number NJM 4580E. Pin 4 of the operational amplifier U13A is coupled to ground and pin 8 is coupled to a 12-volt source. Pin 1 or the output of the operational amplifier U13A is coupled to pin 2 or the negative input terminal of the operational amplifier U13A. Pin 1 of the operational amplifier is also coupled to pin 6 of another potentiometer RP11A, which suitably has a value of about 50 kilo-ohms.

Terminal 2 of the potentiometer RP11A is coupled to terminal 2 of resistor R66, which suitably has a value of about 499 ohms. Terminal 1 of the resistor R66 is coupled to the VREF signal. Terminal 1 of the potentiometer RP11A is coupled to terminal 3 or the positive input terminal of an operational amplifier U14A, which suitably is selected with standardized industry part number NJM 4556AD. Terminal 1 of the operational amplifier U14A is the output of the operational amplifier and is coupled to pin 2, which is the negative input terminal of the operational amplifier. Pin 4 of the operational amplifier U14A is coupled to ground and pin 8 of the operational amplifier is coupled to a 12-volt source. Terminal 1 of the operational amplifier U14A is coupled to terminal 2 of a resistor R64, which suitably has a value of about 33 ohms. Terminal 1 of the resistor R64 is coupled to terminal 1 of a capacitor C56, which suitably has a value of about 100 microfarads. Terminal 2 of the capacitor C56 is coupled to terminal 2 of resistor R65, which suitably has a value of about 10 kilo-ohms. Terminal 1 of resistor R65 is coupled to ground. Terminal 2 of the resistor R65 is also coupled to terminal 1 of the jack J14, which is coupled to the left audio signal distribution of the gamer headphones.

A jack J17 preferably has three pins which are coupled externally to a television set. Pin 3 is coupled to ground. Pin 2 is coupled to a second terminal of a capacitor C50, which has a suitable value of about one microfarad. Terminal 1 of the capacitor C50 is coupled to terminal 1 of a resistor R132, which has a suitable value of about 47 kilo-ohms. Terminal 2 of the resistor R132 is coupled to the VREF signal.

Terminal 1 of the resistor R132 is also coupled to pin 5 or the positive input terminal of an operational amplifier U27B, which suitably is selected with standardized industry part number NJM 4580E. Pin 4 of the operational amplifier U27B is coupled to ground and pin 8 is coupled to a 12-volt source. Pin 7 or the output of the operational amplifier U27B presents right-hand side audio information. Pin 7 of the operational amplifier U27B is coupled to terminal 1 of a resistor R131, which suitably has a value of about 4.99 kilo-ohms. Terminal 2 of the resistor R131 is coupled to pin 6 or the negative input terminal of the operational amplifier U27B. Terminal 2 of the resistor R131 is also coupled to terminal 1 of a resistor R130, which suitably has a value of about 4.99 kilo-ohms. Terminal 2 of the resistor R130 is coupled to the VREF signal. The output of the operational amplifier U27B is also presented to terminal 2 of a resistor R80, which suitably has a value of about 499 ohms. Terminal 1 of the resistor R80 is coupled to terminal 5 of a potentiometer RP12B, which suitably has a value of about 10 kilo-ohms.

Pin 1 of the jack J17 is coupled to terminal 2 of a capacitor C49, which suitably has a value of about 1 microfarad. Terminal 1 of the capacitor C49 is coupled to terminal 1 of a resistor R129, which suitably has a value of about 47 kilo-ohms. Terminal 2 of the resistor R129 is coupled to the VREF signal. Terminal 1 of the resistor R129 is coupled to pin 3 or the positive input terminal of an operational amplifier U27A. Pin 4 of the operational amplifier U27A is coupled to ground and pin 8 is coupled to a 12-volt source. Pin 1 of the operational amplifier U27A is an output of the operational amplifier and the operational amplifier is suitably selected with standardized industry part number NJM 4580E. Pin 1 of the operational amplifier U27A is also coupled to terminal 1 of a resistor R128, which suitably has a value of about 4.99 kilo-ohms. Terminal 2 of the resistor R128 is coupled to pin 2 or the negative input terminal of the operational amplifier U27A. Terminal 2 of the resistor R128 is coupled to terminal 1 of a resistor R127, which suitably has a value of about 4.99 kilo-ohms. Terminal 2 of the resistor R127 is coupled to the VREF signal.

Terminal 1 or the output of the operational amplifier U27A is coupled to a second terminal of a resistor R74, which suitably has a value of about 499 ohms. Terminal 1 of the resistor R74 is coupled to terminal 6 of a potentiometer RP12A, which suitably has a value of about 10 kilo-ohms. Terminal 2 of the potentiometer RP12A is coupled to terminal 1 of a resistor R72, which suitably has a value of about 499 ohms. Terminal 2 of the resistor R72 receives signal information from pin 7 or the output of the operational amplifier U7B as previously discussed in FIG. 4. The signal that is presented to terminal 2 of the resistor R72 can be defined as the microphone exchange signal. The microphone exchange signal is also introduced to terminal 2 of a resistor R79, which suitably has a value of about 499 ohms. Terminal 1 of the resistor R79 is coupled to pin 3 of the potentiometer RP12B.

The potentiometers RP12A, RP12B can be used to adjust the balance of game audio information and microphone audio information. Pin 4 of the potentiometer RP12B is the output of the potentiometer RP12B and is presented to pin 5 or the positive input terminal of an operational amplifier U15B, which suitably is selected with standardized industry part number NJM 4580E. Pin 4 of the operational amplifier U15B is coupled to ground and pin 8 is coupled to a 12-volt source. Pin 7 or the output of the operational amplifier U15B is coupled to pin 6 or the negative input terminal of the operational amplifier U15B. Pin 7 of the operational amplifier is also coupled to pin 5 of another potentiometer RP13B, which suitably has a value of about 50 kilo-ohms. Pin 3 of the potentiometer RP13B is coupled to terminal 2 of resistor R83, which suitably has a value of about 499 ohms. Terminal 1 of the resistor R83 is coupled to the VREF signal.

Terminal 4 of the potentiometer RP13B is the output of the potentiometer and is coupled to terminal 5 or the positive input terminal of an operational amplifier U16B. Terminal 4 of the operational amplifier U16B is coupled to ground and terminal 8 of the operational amplifier is coupled to a 12-volt source. Terminal 7 of the operational amplifier U16B is the output and the operational amplifier U16B is suitably selected with standardized industry part number NJM 4556AD. Terminal 7 of the operational amplifier is coupled to terminal 6 or the negative input terminal of the operational amplifier U16B. Terminal 7 of the operational amplifier U16B is also coupled to terminal 2 of a resistor R81, which suitably has a value of about 33 ohms. Terminal 1 of the resistor R81 is coupled to terminal 1 of a capacitor C28, which suitably has a value of about 100 microfarad. Terminal 2 of the capacitor C28 is coupled to terminal 2 of resistor R82, which suitably has a value of about 10 kilo-ohms. Terminal 1 of the resistor R82 is coupled to ground. Terminal 2 of the resistor R82 is also coupled to pin 2 of a jack J16, which is coupled to a pair of gamer headphones, such as those of a first gamer. Pin 2 provides right-hand audio information.

Pin 1 of the potentiometer RP12A is the output of the potentiometer RP12A and is presented to pin 3 or the positive input terminal of an operational amplifier U15A, which suitably is selected with standardized industry part number NJM 4580E. Pin 4 of the operational amplifier U15A is coupled to ground and pin 8 is coupled to a 12-volt source. Pin 1 or the output of the operational amplifier U15A is coupled to pin 2 or the negative input terminal of the operational amplifier U15A. Pin 1 of the operational amplifier is also coupled to pin 6 of another potentiometer RP13A, which suitably has a value of about 50 kilo-ohms.

Terminal 2 of the potentiometer RP13A is coupled to terminal 2 of resistor R78, which suitably has a value of about 499 ohms. Terminal 1 of the resistor R78 is coupled to the VREF signal. Terminal 1 of the potentiometer RP13A is coupled to terminal 3 or the positive input terminal of an operational amplifier U16A, which suitably is selected with standardized industry part number NJM 4556AD. Terminal 1 of the operational amplifier U16A is the output of the operational amplifier and is coupled to pin 2, which is the negative input terminal of the operational amplifier. Pin 4 of the operational amplifier U16A is coupled to ground and pin 8 of the operational amplifier is coupled to a 12-volt source. Terminal 1 of the operational amplifier U16A is coupled to terminal 2 of a resistor R76, which suitably has a value of about 33 ohms. Terminal 1 of the resistor R76 is coupled to terminal 1 of a capacitor C27, which suitably has a value of about 100 microfarads. Terminal 2 of the capacitor C27 is coupled to terminal 2 of resistor R77, which suitably has a value of about 10 kilo-ohms. Terminal 1 of resistor R77 is coupled to ground.

Terminal 2 of the resistor R77 is also coupled to terminal 1 of the jack J16, which is coupled to the left audio signal distribution of the gamer headphones.

Pin 5 of a potentiometer RP14B, which suitably has a value of about 50 kilo-ohms, receives signal information from pin 7 or the output of the operational amplifier U7B as previously discussed in FIG. 4. This signal that is presented to pin 5 of the potentiometer RP14B can be defined as the microphone exchange signal. The microphone exchange signal is also introduced to terminal 6 of another potentiometer RP14A, which suitably has a value of about 50 kilo-ohms. Pin 3 of the potentiometer RP14B is coupled to terminal 2 of resistor R92, which suitably has a value of about 499 ohms. Terminal 1 of the resistor R92 is coupled to the VREF signal.

Terminal 4 of the potentiometer RP14B is the output of the potentiometer and is coupled to terminal 5 or the positive input terminal of an operational amplifier U17B. Terminal 4 of the operational amplifier U17B is coupled to ground and terminal 8 of the operational amplifier is coupled to a 12-volt source. Terminal 7 of the operational amplifier U17B is the output and the operational amplifier U17B is suitably selected with standardized industry part number NJM 4556AD. Terminal 7 of the operational amplifier is coupled to terminal 6 or the negative input terminal of the operational amplifier U17B. Terminal 7 of the operational amplifier U17B is also coupled to terminal 2 of a resistor R90, which suitably has a value of about 33 ohms. Terminal 1 of the resistor R90 is coupled to terminal 1 of a capacitor C30, which suitably has a value of about 100 microfarad. Terminal 2 of the capacitor C30 is coupled to terminal 2 of resistor R91, which suitably has a value of about 10 kilo-ohms. Terminal 1 of the resistor R91 is coupled to ground. Terminal 2 of the resistor R91 is also coupled to pin 2 of a jack J18, which is coupled to a pair of gamer headphones, such as those of a first gamer. Pin 2 provides right-hand audio information.

Terminal 2 of the potentiometer RP14A is coupled to terminal 2 of resistor R88, which suitably has a value of about 499 ohms. Terminal 1 of the resistor R88 is coupled to the VREF signal. Terminal 1 of the potentiometer RP14A is coupled to terminal 3 or the positive input terminal of an operational amplifier U17A, which suitably is selected with standardized industry part number NJM 4556AD. Terminal 1 of the operational amplifier U17A is the output of the operational amplifier and is coupled to pin 2, which is the negative input terminal of the operational amplifier. Pin 4 of the operational amplifier U17A is coupled to ground and pin 8 of the operational amplifier is coupled to a 12-volt source. Terminal 1 of the operational amplifier U17A is coupled to terminal 2 of a resistor R86, which suitably has a value of about 33 ohms. Terminal 1 of the resistor R86 is coupled to terminal 1 of a capacitor C29, which suitably has a value of about 100 microfarads. Terminal 2 of the capacitor C29 is coupled to terminal 2 of resistor R87, which suitably has a value of about 10 kilo-ohms. Terminal 1 of resistor R87 is coupled to ground. Terminal 2 of the resistor R87 is also coupled to terminal 1 of the jack J18, which is coupled to the left audio signal distribution of the technican's headphones.

While illustrative embodiments have been illustrated and described, it will be appreciated that various changes can be made therein without departing from the spirit and scope of the invention.

The embodiments of the invention in which an exclusive property or privilege is claimed are defined as follows:

1. A system comprising:
   a game communications exchange having multiple ports, a first of said multiple ports is configured to receive first game audio information from a first game console and a second of said multiple ports is configured to receive second game audio information from a second game console, wherein the first game console and second game console are connected via a local area network and not the Internet, the game communications exchange comprising:
- a first set of circuitry configured for transmitting first game audio information received from the first game console to a first gamer audio gear set the first game audio information comprising sounds from a game being played on the first game console;
- a second set of circuitry configured for transmitting second game audio information received from the second game console to a second gamer audio gear set, the second game audio information comprising sounds from a game being played on the second game console; and
- a mixer including summing circuitry configured for creating a summed common channel of first chat audio information received from a microphone of the first gamer audio gear set and second chat audio information received from a microphone of the second gamer audio gear set, wherein the summing circuitry sums the first chat audio information and second chat audio information and transmits the resulting summed common channel to both the first gamer audio gear set and second gamer audio gear set, wherein the game communications exchange is external to both the first game console and second game console.

2. The system of claim 1, further comprising technician audio gear coupled to the game communications exchange for a technician to listen to.

3. The system of claim 1, wherein the game communications exchange is coupled to a recording instrument such that the first chat audio information and second chat audio information are recorded.

4. The system of claim 1, wherein the game communications exchange further comprises at least one potentiometer to allow adjustment of a balance of the game audio information from the first game console and chat audio information from the common channel.

5. The system of claim 4, wherein the game communications exchange further comprises at least one potentiometer to allow the adjustment of a balance of the game audio information from the second game console and chat audio information from the common channel.

6. The system of claim 1, wherein the game communications exchange further comprises a third set of circuitry configured for transmitting game audio information from a third game console to a third gamer audio gear set, and wherein the summing circuitry adds chat audio information from the third gamer audio gear set to the common channel and transmits the common channel to the third audio gear set.

7. The system of claim 6, wherein the game communications exchange further comprises at least one potentiometer to allow the adjustment of a balance of the game audio information from the third game console and chat audio information from the common channel.

8. The system of claim 6, wherein the game communications exchange further comprising a fourth set of circuitry configured for transmitting game audio information from a fourth game console to a fourth gamer audio gear set, and wherein the summing circuitry adds chat audio information from the fourth gamer audio gear set to the common channel and transmits the common channel to the fourth audio gear set.

9. The system of claim 8, wherein the game communications exchange further comprises at least one potentiometer to allow the adjustment of a balance of the game audio information from the fourth television set and chat audio information from the common channel.

* * * * *